(12) United States Patent
Roesler et al.

(10) Patent No.: US 6,619,360 B1
(45) Date of Patent: Sep. 16, 2003

(54) STACKABLE DOMED-DISC SPACING APPARATUS FOR VINYL FLOOR REPAIR

(76) Inventors: Tracy P. Roesler, 5215 E. Orchard, Nampa, ID (US) 83687; Glen L. Durrant, 7825 W. Elm Brook, Boise, ID (US) 83703

( * ) Notice: Subject to any disclaimer, the term of this patent is extended or adjusted under 35 U.S.C. 154(b) by 35 days.

(21) Appl. No.: 09/609,082

(22) Filed: Jun. 30, 2000

(51) Int. Cl.[7] ............................................. B32B 35/00
(52) U.S. Cl. .......................... 156/494; 156/71; 156/94; 156/514; 206/582; 52/514; 52/749.11; 83/175; 83/176
(58) Field of Search .............................. 156/94, 98, 71, 156/494, 514; 83/175, 176, 953; 411/404, 445, 923; 269/289 R; 220/4.07, 4.26, 4.27; 206/582; 52/514, 749.11, DIG. 1

(56) References Cited

U.S. PATENT DOCUMENTS

| | | | | |
|---|---|---|---|---|
| 2,289,561 A | * | 7/1942 | West | 411/404 |
| 2,366,510 A | * | 1/1945 | Frank | 206/343 |
| 3,911,516 A | * | 10/1975 | Einhorn | 248/497 |
| 4,167,974 A | * | 9/1979 | Job | 169/38 |
| 4,765,501 A | * | 8/1988 | Kao | 220/4.21 |
| 5,370,487 A | * | 12/1994 | Kracke | 248/316.7 |
| D414,825 S | * | 10/1999 | Gans | D21/464 |
| 6,196,782 B1 | * | 3/2001 | Wagner et al. | 411/485 |

OTHER PUBLICATIONS

Printout of website www.sierra.com, dated Jun. 9, 2000.
Printout of website www.todayshomeowner.com dated Jun. 9, 2000.

* cited by examiner

Primary Examiner—Michael W. Ball
Assistant Examiner—Gladys Corcoran
(74) Attorney, Agent, or Firm—Pedersen & Co., PLLC; Ken J. Pedersen; Barbara S. Pedersen

(57) ABSTRACT

The present invention is a floor vinyl repair technique and tool. According to the present invention, the prior art repair technique is practiced, except a special domed-disc spacer is placed between the patch and the damaged piece to be removed before the cut through both layers with the knife. This way, the replacement patch is elevated slightly above the damaged piece. This slight elevation allows for a slight increase in the perimeter of the patch, and offsets the slight stretching of the patch during the cut, thereby resulting in a more exact fit between the patch and the surrounding, original undamaged vinyl when the patch is installed.

5 Claims, 4 Drawing Sheets

STACKABLE DOMED-DISC SPACING APPARATUS FOR VINYL FLOOR REPAIR

BACKGROUND OF THE INVENTION

1. Field of the Invention

This invention relates generally to flooring and more specifically to repairs for damaged vinyl floors.

2. Related Art

Vinyl as a flooring material has become very popular. Many millions of square feet of vinyl flooring are installed every year. Often, after or during installation, the vinyl flooring is damaged by dents, holes, scrapes or scratches. Then, the vinyl flooring needs to be repaired.

Typically, the repair of this damage to vinyl flooring is done by:

- Cutting an oversized replacement patch that matches the pattern in the damaged area;
- Aligning the patch and taping it in place;
- Cutting through both layers with a utility knife;
- Removing the patch and peeling up the damaged flooring with a scraper, taking care not to damage the cut edges, and using a heat gun or iron to soften the adhesive, if necessary;
- Applying new flooring adhesive to the patch and pressing it in place; and
- Wiping off any excess adhesive with a damp cloth and covering the patch with a weight for 24 hours.

Preferably, the cut is made along the flooring pattern lines, if any, to make the repair less visible. If it is discovered that the section to be removed isn't attached to the subfloor by adhesive, an attempt to slip some new adhesive underneath the exposed edges of the original vinyl to keep it in place is recommended.

However, whenever this prior art repair technique is practiced, the seam between the original vinyl and the replaced, repair piece is noticeable. The seam may be barely noticeable, but it is there nonetheless, and irritating to discriminating homeowners and floor repairmen. The reason for the seam is because typically the cut replacement piece turns out to be slightly smaller than the original damaged piece. We think this is because the top piece of vinyl is stretched slightly when it is cut with the knife while overlaying the relatively soft damaged piece. The damaged piece, on the other hand, is constrained by the supporting floor, and bound by an underlying adhesive, so it does not stretch, or stretches less, when cut. This way, after the cut is performed, the replacement piece is slightly smaller than the original damaged piece, leaving a slight seam between the original, undamaged vinyl and the inserted replacement piece. Typically, the industry craftsmen have filled this seam with seam sealer or filler. However, it has been a desire in the industry to eliminate this seam space as much as possible. Therefore, this invention is addressed to satisfy this desire for a closer fit between the inserted replacement vinyl piece and the surrounding, original undamaged vinyl.

SUMMARY OF THE INVENTION

The present invention is a floor vinyl repair technique and tool. According to the present invention, the prior art repair technique is practiced, except a special domed-disc spacer is placed between the patch and the damaged piece to be removed before the cut through both layers with the knife. This way, the replacement patch is elevated slightly above the damaged piece to be removed. This slight elevation allows for a slight increase in the perimeter of the patch, and offsets the slight stretching of the patch during the cut, thereby resulting in a more exact fit between the patch and the surrounding, original undamaged vinyl when the patch is installed.

By trial and error and experience, we have determined an estimated relationship between the size of the spacer to be inserted between the two layers of vinyl before the cut, and the size of the replacement patch.

DESCRIPTION OF THE PREFERRED EMBODIMENTS

Figure 1:
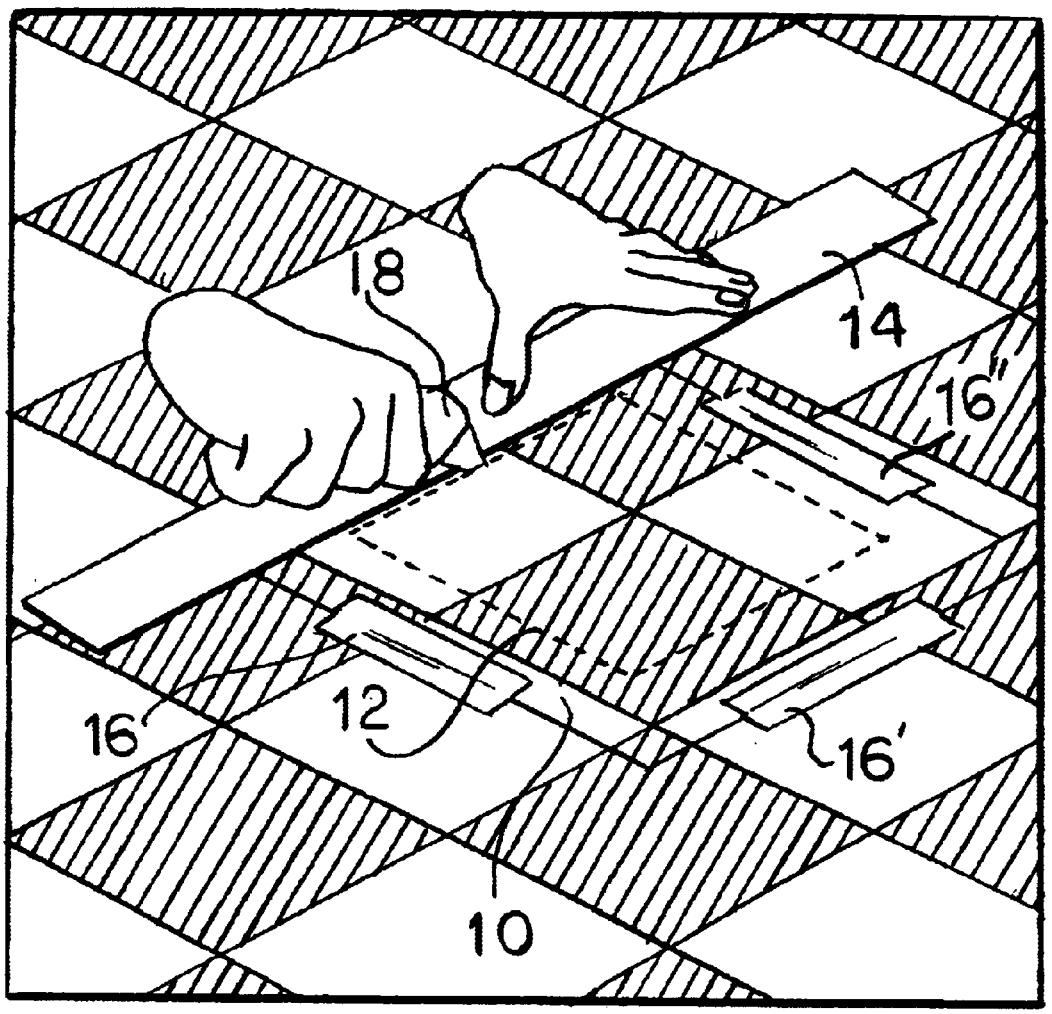
FIG. 1 is a perspective view of the prior art vinyl flooring repair technique.
Figure 2:
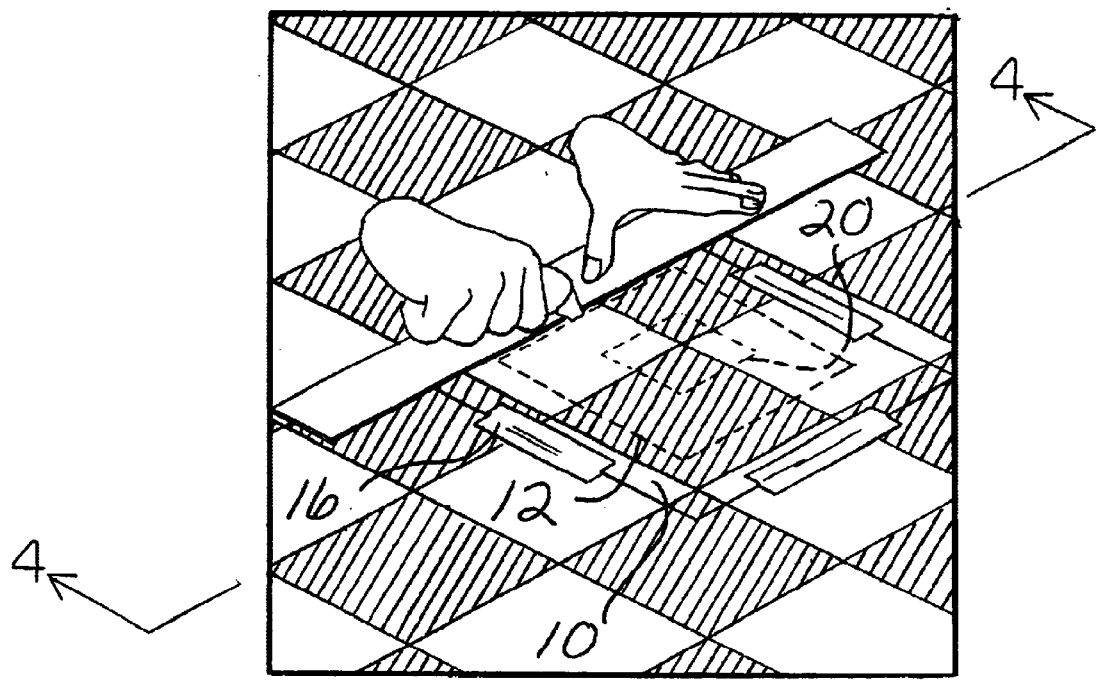
FIG. 2 is a perspective view of the vinyl flooring repair technique according to the present invention.
Figure 3A:
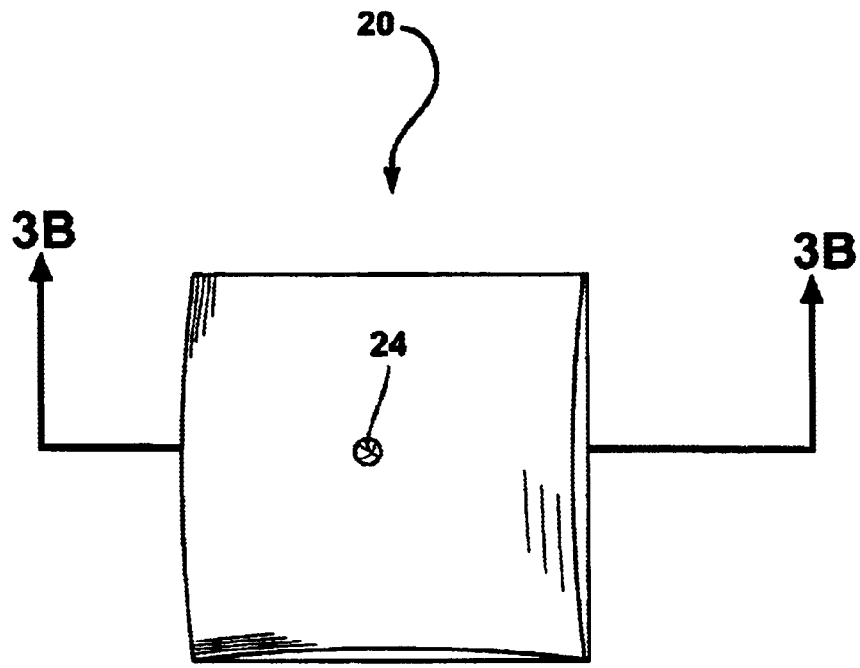
FIG. 3 is a side view of various embodiments of the repair tool insert according to the present invention.
Figure 3B:
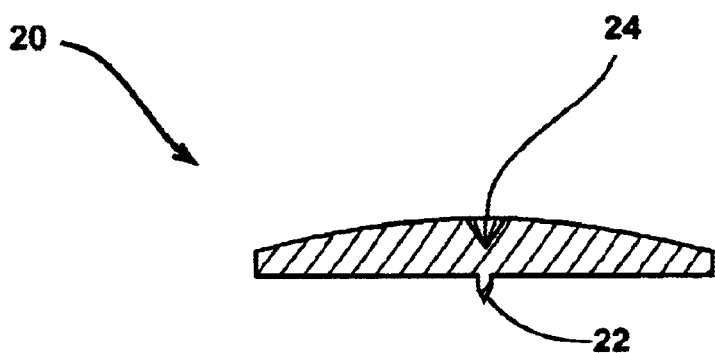
Figure 4:
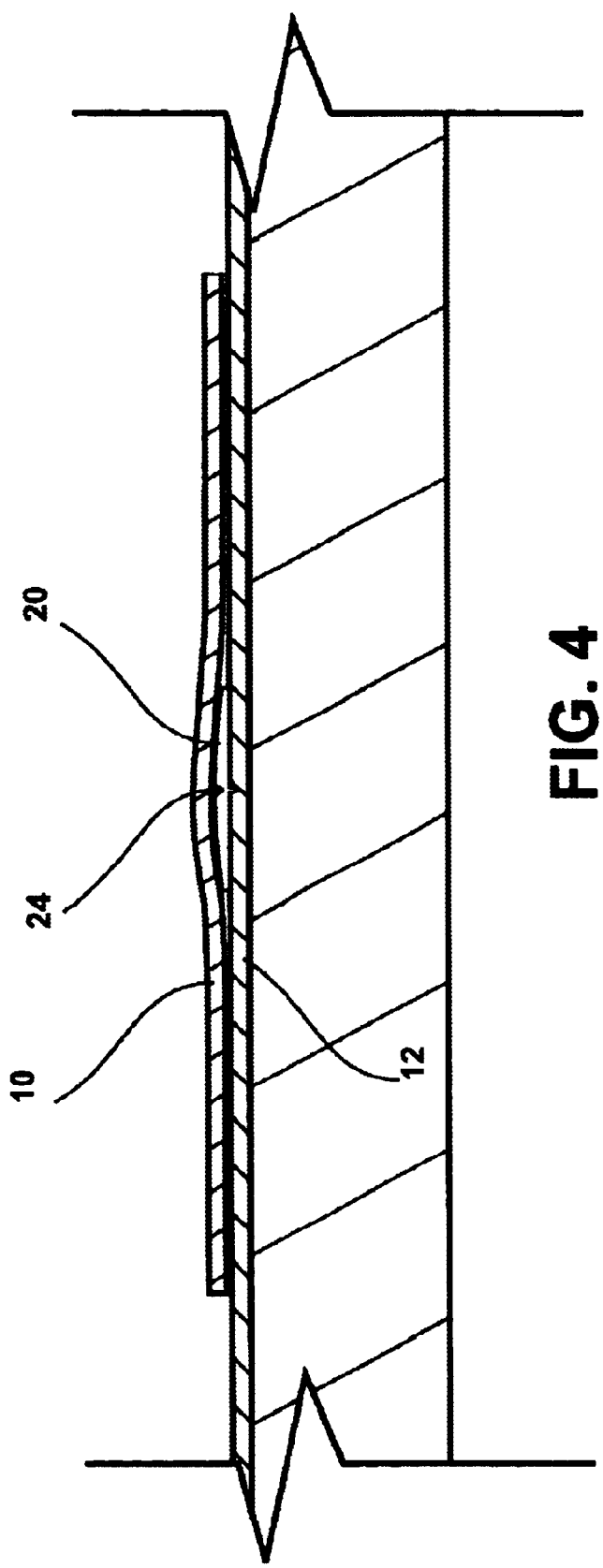
FIG. 4 is a side-cross-sectional view along line 4—4 in FIG. 2.

Referring to FIGS. 2 and 3, there are depicted several, but not all, embodiments of the present invention. In FIG. 1 is depicted the prior are vinyl flooring repair technique. According to FIG. 1, patch 10 is laid over damaged vinyl section 12 and the surrounding, original undamaged vinyl 14. The patch 10 is aligned to match the pattern on the damaged area and taped into place with tape strips 16, 16' and 16". Then, both layers of vinyl, patch 10 and damaged section 12, are cut with utility knife 18, the patch 10 is removed, and the damaged section 12 is peeled up off the floor with a scraper (not shown). Then, new adhesive is applied to the patch 10 and the patch is pressed into place where the damaged section 12 was removed. Any excess adhesive is removed with a damp cloth, and this patch 10 is covered with a weight for about 24 hours to hold it in place while the adhesive dries.

In FIG. 2 is depicted the vinyl floor repairing technique according to the present invention. According to the present invention the prior art repair technique is practiced, except a special domed-disc spacer 20 is placed between the patch and the damaged piece before the cut through both layers with the knife. This way, the replacement patch is elevated slightly above the damaged piece to be removed. This slight elevation allows for a slight increase in the perimeter of the patch, and offsets the slight stretching of the patch during the cut, thereby resulting in a more exact fit between the patch and the surrounding, original undamaged vinyl when the patch is installed.

Preferably, the domed-disc spacer is placed near the center of the damaged section 12 underneath the patch 10 prior to the cut. Depending upon the size of the patch, preferably different sized spacers may be used. A combination thickness and radius or size of the domed-disc spacer is important. For example, for replacing a damaged section about 3 to 5 inches square, a domed-disc about 1/8" high at the center and about 7/8" square (disc #1) is preferably used. Likewise, to replace other damaged square sections:

| Size of Square | Size of Disc |
| --- | --- |
| 3 to 5" | ⅛" high × ⅞" (disc #1) |
| 5 to 8" | 3⁄16" high × 1½" (disc #2) |
| 8 to 11" | stack disc #1 on top of disc #2 |
| 11 to 18" | 5⁄16" high × 2¾" (disc #3) |
| 18 to 24" | stack disc #2 on top of disc #3 |
| 24" and up | stack disc #1 on top of disc #2, and disc #2 on top of disc #3 |

The domed-disc can be any shape which conveniently takes up space between patch 10 and damaged section 12. We prefer a squared-off domed-disc because the square shape helps align the disc in the center of damaged section 12. We prefer the domed-disc because the patch slides easily over the dome when aligning it with the pattern in the original, undamaged vinyl 14.

Preferably a pointed tip 22 is provided on the bottom of the domed-disc to better engage the damaged section 12 once the disc is centered. Also, preferably, a conical depression 24 is provided on the top center of the domed-disc to enable several of the discs to be stacked for use and for storage.

Although this invention has been described above with reference to particular means, materials and embodiments, it is to be understood that the invention is not limited to these disclosed particulars, but extends instead to all equivalents within the scope of the following claims.

We claim:

1. A floor repair system comprising:
   a damaged flooring section located on a floor;
   a replacement flooring patch positioned on top of the damaged flooring section and having an upper surface, a bottom surface, a center, a length, and a width; and
   a spacer having a spacer top surface, a spacer bottom surface, a height between said spacer top surface and said spacer bottom surface, a spacer length, and a spacer width, wherein said spacer top surface is a dome;
   wherein said spacer is placed between the damaged flooring section and the replacement flooring patch bottom surface at or near said center so that the spacer top surface contacts the replacement flooring patch bottom surface and raises the replacement flooring patch center a distance from the damaged flooring section;
   wherein, during cutting of said replacement flooring patch and said damaged flooring section to cut out the damaged flooring section and to form an outer perimeter of said replacement flooring patch, said raising of the replacement flooring patch by the spacer slightly increases said outer perimeter of the replacement flooring patch.

2. A floor repair system as in claim 1, wherein said spacer is selected from a group of spacers consisting of:
   spacers that are about ⅛ inch high, about ⅞ inch wide, and about ⅞ inch long;
   spacers that are about 3⁄16 inch high, about 1½ inch wide, and about 1½ inch long; and
   spacers that are about 5⁄16 inch high, about 2¾ inches wide, and about 2¾ inches long.

3. A floor repair system as in claim 1, wherein a second spacer is stacked on top of said spacer so that said spacer and said second spacer are both positioned between the replacement flooring patch and the damaged flooring section.

4. A floor repair system as in claim 3, wherein said spacer and said second spacer are selected from a group of spacers consisting of:
   spacers that are about ⅛ inch high, about ⅞) inch wide, and about ⅞ inch long;
   spacers that are about 3⁄16 inch high, about 1½ inch wide, and about 1½ inch long; and
   spacers that are about 5⁄16 inch high, about 2¾ inch wide, and about 2¾ inch long.

5. A floor repair system comprising:
   a damaged flooring section located on a floor;
   a replacement flooring patch positioned on top of the damaged flooring section and having an upper surface, a bottom surface, a center, a length, and a width; and
   a plurality of spacers each having a spacer top surface, a spacer bottom surface, a height between said spacer top surface and said spacer bottom surface, a spacer length, and a spacer width;
   wherein said plurality of spacers are placed between the damaged flooring section and the replacement flooring patch bottom surface at or near said center to raise the replacement flooring patch center a distance from the damaged flooring section;
   wherein, during cutting of said replacement flooring patch and said damaged flooring section to cut out the damaged flooring section and to form an outer perimeter of said replacement flooring patch, said raising of the replacement flooring patch by the plurality of spacers slightly increases said outer perimeter of the replacement flooring patch;
   wherein each of said plurality of spacers has a pointed tip near the center of its bottom surface, and a depression near the center of its top surface, which said tip adapted to cooperate with said depression for stacking said plurality of spacers, between the damaged flooring section and the replacement flooring patch.

* * * * *